United States Patent
Liu et al.

(10) Patent No.: US 12,182,729 B2
(45) Date of Patent: Dec. 31, 2024

(54) METHOD AND APPARATUS FOR RECOMMENDING CONTENT, DEVICE, AND MEDIUM

(71) Applicant: Beijing Baidu Netcom Science and Technology Co., Ltd., Beijing (CN)

(72) Inventors: Hesheng Liu, Bejing (CN); Yu Wang, Bejing (CN); Yuling Xiong, Bejing (CN); Zhiming Peng, Bejing (CN); Naifei Song, Bejing (CN); Shouke Qin, Bejing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 867 days.

(21) Appl. No.: 17/211,720

(22) Filed: Mar. 24, 2021

(65) Prior Publication Data
US 2021/0209491 A1  Jul. 8, 2021

(30) Foreign Application Priority Data
Sep. 1, 2020 (CN) .......................... 202010905989.6

(51) Int. Cl.
G06Q 30/0601  (2023.01)
G06N 5/04  (2023.01)
G06N 20/00  (2019.01)

(52) U.S. Cl.
CPC .............. *G06N 5/04* (2013.01); *G06N 20/00* (2019.01); *G06Q 30/0631* (2013.01)

(58) Field of Classification Search
CPC .......... G06N 5/04; G06N 20/00; G06N 3/045; G06N 3/084; G06Q 30/0631
(Continued)

(56) References Cited

U.S. PATENT DOCUMENTS 10,198,524 B1 * 2/2019 Amalapurapu ....... G06F 16/958
11,100,554 B1 * 8/2021 Gupta ................. G06F 16/9535
(Continued)

FOREIGN PATENT DOCUMENTS

CN         111209470 A     5/2020
JP         2001285744 A    10/2001
(Continued)

OTHER PUBLICATIONS

Extended European Search Report dated Apr. 16, 2021 in EP Application No. 21163895.2.

*Primary Examiner* — Hien L Duong
(74) *Attorney, Agent, or Firm* — Weaver Austin Villeneuve & Sampson LLP

(57) ABSTRACT

A method and apparatus for recommending a content, a device, and a medium are provided. The method may include: determining, based on historical behavior data of a user using a product and a feature of a structure of a to-be-recommended content, a target structural preference of the user, the structure being determined by classifying the to-be-recommended content based on any classifying method of a content tag system; and determining each recommendation result of the user based on the target structural preference, the recommendation result including at least two structures and a recommendation content corresponding to each structure.

12 Claims, 4 Drawing Sheets

(58) Field of Classification Search
CPC ............... G06Q 30/0251; G06Q 50/10; G06Q 30/0255; G06F 16/9535; G06F 18/24; H04N 21/4532; H04N 21/4668
See application file for complete search history.

(56) References Cited

U.S. PATENT DOCUMENTS

| | | | | |
|---|---|---|---|---|
| 11,138,631 | B1* | 10/2021 | Perevodchikov | G06N 20/20 |
| 11,756,106 | B1* | 9/2023 | Jaffery | G06Q 30/0643 |
| | | | | 705/26.7 |
| 2006/0041550 | A1* | 2/2006 | Bennett | G06F 16/9538 |
| | | | | 707/999.005 |
| 2009/0006357 | A1* | 1/2009 | Popescul | G06F 16/9535 |
| | | | | 707/999.005 |
| 2011/0213786 | A1 | 9/2011 | Wu et al. | |
| 2013/0031079 | A1* | 1/2013 | El Daher | G06F 16/248 |
| | | | | 707/706 |
| 2017/0140041 | A1* | 5/2017 | Dotan-Cohen | G06F 16/335 |
| 2018/0129749 | A1 | 5/2018 | Hu | |
| 2020/0019563 | A1 | 1/2020 | Moon et al. | |
| 2020/0137443 | A1* | 4/2020 | McEnroe | H04N 21/44224 |
| 2021/0142196 | A1* | 5/2021 | R | G06F 16/258 |
| 2021/0295177 | A1* | 9/2021 | Joshi | G06N 5/04 |
| 2022/0067115 | A1* | 3/2022 | Zheng | G06N 5/04 |

FOREIGN PATENT DOCUMENTS

| | | |
|---|---|---|
| JP | 2007060398 A | 3/2007 |
| JP | 2009252179 A | 10/2009 |
| JP | 2010041163 A | 2/2010 |
| JP | 2015154440 A | 8/2015 |
| JP | 2019057259 A | 4/2019 |
| KR | 20130026567 A | 3/2013 |
| KR | 20130035064 A | 4/2013 |
| KR | 20200049193 A | 5/2020 |

* cited by examiner

METHOD AND APPARATUS FOR RECOMMENDING CONTENT, DEVICE, AND MEDIUM

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of Internet, specifically to an intelligent recommendation technology, and more specifically to a method and apparatus for recommending a content, a device, and a medium.

BACKGROUND

Individualized content recommendation strategies have been widely applied to current Internet products based on content ecology. An existing method for recommending a content mainly includes a layer-by-layer selection mechanism with three stages of recalling, sorting and fusing, including a recalling module, a sorting module, and a fusing module. The recalling module preliminarily selects a content that a user may be interested in from a full resource database based on basic information and user behavior history of the user; the sorting module scores contents returned from the recalling module one by one using a machine learning algorithm; and the fusing module ranks scores provided by the sorting module in ascending order, and implements a service logic such as diversity to assemble a final recommendation result.

However, the method for recommending a content based on the layer-by-layer selection mechanism has achieved relatively excellent recommendation effects, but still has defects in matching between content supply and user preference.

SUMMARY

Embodiments of the present disclosure provide a method and apparatus for recommending a content, a device, and a medium, to enhance the matching degree between content supply and user preference.

In a first aspect, an embodiment of the present disclosure provides a method for recommending a content, the method including: determining, based on historical behavior data of a user using a product and a feature of a structure of a to-be-recommended content, a target structural preference of the user, the structure being determined by classifying the to-be-recommended content based on any classifying method of a content tag system; and determining each recommendation result of the user based on the target structural preference, the recommendation result comprising at least two structures and a recommendation content corresponding to each structure.

In a second aspect, an embodiment of the present disclosure provides an apparatus for recommending a content, the apparatus including: a structural preference determining module configured to determine, based on historical behavior data of a user using a product and a feature of a structure of a to-be-recommended content, a target structural preference of the user, the structure being determined by classifying the to-be-recommended content based on any classifying method of a content tag system; and a recommendation result determining module configured to determine each recommendation result of the user based on the target structural preference, the recommendation result comprising at least two structures and a recommendation content corresponding to each structure.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to perform the method for recommending a content according to any embodiment of the present disclosure.

In a fourth aspect, an embodiment of the present disclosure provides a non-transitory computer readable storage medium storing computer instructions, the computer instructions being used to cause a computer to perform the method for recommending a content according to any embodiment of the present disclosure.

It should be understood that the content described in this section is neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose a limitation on the present disclosure.

DETAILED DESCRIPTION OF EMBODIMENTS

Example embodiments of the present disclosure are described below with reference to the accompanying drawings, including various details of embodiments of the present disclosure to contribute to understanding, which should be considered merely as examples. Therefore, those of ordinary skills in the art should realize that various alterations and modifications can be made to embodiments described here without departing from the scope and spirit of the present disclosure. Similarly, for clearness and conciseness, descriptions of well-known functions and structures are omitted in the following description.

The technical solutions according to embodiments of the present disclosure determine a structural preference of a user to realize global-oriented structured representation and interest reasoning, and then determine a recommendation result based on the structural preference, such that there is a corresponding to-be-recommended content in the recommendation result based on each different structure, thereby providing a to-be-recommended content better satisfying the user preference, and enhancing the matching degree between the content supply and the user preference.

Figure 1:
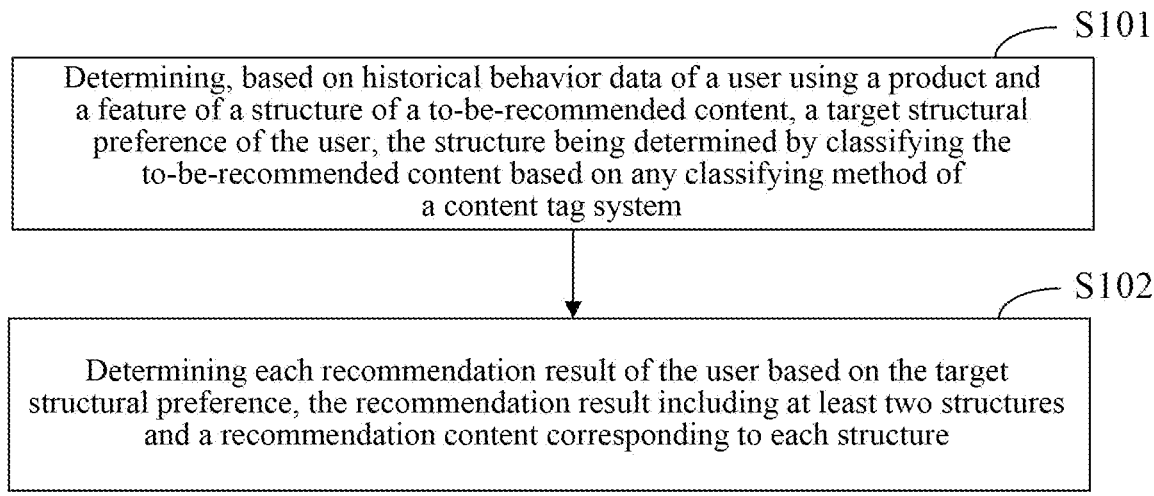
FIG. 1 is a schematic flowchart of a method for recommending a content according to an embodiment of the present disclosure.

FIG. 1 is a schematic flowchart of a method for recommending a content according to an embodiment of the present disclosure. The present embodiment is applicable to a case of recommending a content for a user, e.g., recommending a content for a user through a feed system, and relates to intelligent recommendation, deep learning, and big data technologies. The method may be executed by an apparatus for recommending a content. The apparatus may be implemented by software and/or hardware, and may be configured in an electronic device, such as a server or a computer device. As shown in FIG. 1, the method includes following steps.

S101: determining, based on historical behavior data of a user using a product and a feature of a structure of a to-be-recommended content, a target structural preference of the user, the structure being determined by classifying the to-be-recommended content based on any classifying method of a content tag system.

A resource content recommendable by an Internet product based on content ecology may be classified into different structures based on any classifying method of a content tag system, and each structure corresponds to a corresponding resource content. In addition, the structure in embodiments of the present disclosure may be an explicit structure or an implicit structure. The explicit structure is a category structure with practical significance classified according to a certain classifying method, e.g., different structures such as videos and image texts, sports and entertainment, or international and domestic; while the implicit structure may not necessarily have practical significance, may bean abstract classifying method, and specifically may be defined based on service requirements. Embodiments of the present disclosure do not impose any limitation on the classifying method for the structure. The technical solutions of embodiments of the present disclosure are applicable to a structure classified according to any method.

The historical behavior data of the user using the product, e.g., may include user behaviors, such as what to-be-recommended contents are clicked, or which to-be-recommended contents have never been clicked, or which to-be-recommended contents are browsed for a long time. Analysis of these user behaviors may reflect structures of to-be-recommended contents that the user is more interested in, structures of to-be-recommended contents that the user is less interested in, or the like, and the preference relationship of the user may be referred to as a structural preference. The target structural preference of the user may be determined based on the historical behavior data of the user using the product in combination with a structural feature of the structure itself. The structural feature of the structure itself may be, for example, a name of the structure, or a degree of popularity or interest of a structure among many structures, or a combination of the two, all of which may be used as the structural feature of the structure itself, thus providing the basis for individualized scoring of different structures.

In a specific implementation, a prediction model may be pre-established and trained based on a deep learning method, and the determining the target structural preference of the user based on the historical behavior data and the feature of the structure may be implemented based on the prediction model. For example, the degree of the user's interest in each structure is predicted based on the prediction model and by scoring, and a score or a percentage is obtained as an estimated value, and then a top preset number of structures are selected from all estimated values based on scores to obtain a final structural preference. Embodiments of the present disclosure do not limit the used specific model structure and algorithm.

S102: determining each recommendation result of the user based on the target structural preference, the recommendation result including at least two structures and a recommendation content corresponding to each structure.

The determining the target structural preference is equivalent to acquiring at least two structures that the user is most interested in. Then, a corresponding recommendation content is acquired based on each structure, and these structures and recommendation contents thereof constitute a final recommendation result.

Specifically, each recommendation result of the user may be determined through three stages of recalling, sorting, and fusion based on the target structural preference. That is, in the recalling and sorting stages, structured recalling and sorting are implemented, and recalling and sorting are performed based on different structures. In the fusion stage, structured fusion is implemented, and fusion is performed under each structure. The corresponding recommendation content is determined based on each structure. Embodiments of the present disclosure do not impose any limitation on a recalling algorithm, a sorting algorithm, and a fusion algorithm specifically used therein.

Here, it should be noted that a recommendation strategy framework of layer-by-layer selection based on recalling, sorting, and fusion in existing technologies often has defects in respect of the matching between content supply and user preference.

Firstly, in the existing technologies, a fusing module uses an inverted order of scores to form a final distribution result. For example, if the user clicks more video contents than image contents, more video contents will be provided under the recommendation strategy framework of layer-by-layer selection. It is possible that the first 100 recommended contents are all videos, thereby resulting in no explicit control over the structure of the distributed content, and very likely resulting in the mismatching between the distributed structure and the user preference. The fact that the user has historically clicked more video contents does not mean that the user is only interested in video contents. In embodiments of the present disclosure, content recommendation may be performed based on a real structured demand of a user. The final recommendation result includes at least two structures and a recommendation content corresponding to each structure, thereby realizing structured explicit control, recommending all contents that the user may be interested in to the user in a plurality of structures, while improving the diversity and abundance of the recommendation content, providing great help to guide the user in immersive experience and consumption.

Secondly, for a user with a less popular interest, during layer-by-layer selection based on an existing technology, such an interest is easily overwhelmed by generally highly scored universal interests, such that the user's demand is not fully satisfied. Therefore, the layer-by-layer selection mechanism in the existing technology tends to overwhelm less popular interests and generate information cocoons. However, in embodiments of the present disclosure, because of global-oriented structured representation and interest reasoning, a structural preference of the user is first determined, and then structured content recommendation is performed. Therefore, not only can these popular universal interests be recommended, but also those less popular interests satisfying the user demand can be recommended, thereby breaking the information cocoons, and providing a recommendation content satisfying the real structural demand of the user.

Thirdly, the method for recommending a content based on layer-by-layer selection of the existing technology often uses an approach of adjusting weights at various levels when it is necessary to achieve a specific service target. When the service target is gradually increased, a recommendation system will tend to be a black box, and when one service target is satisfied, another service target will be affected. It is difficult to balance between various service targets, thereby restricting the integral development of the system. However, the structured content recommendation based on user interest reasoning implemented in embodiments of the present disclosure can avoid this problem. For example, structured classification is performed on resources based on different service targets, and then interest reasoning and structured recommendation are performed, thereby avoiding the problem of mutual influence between various service targets.

In addition, before the determining each recommendation result of the user based on the target structural preference, the method may further include exploring in a structural dimension based on the target structural preference. For example, a reasoned structural preference reflects a real structural preference reasoned based on a historical behavior of the user. However, for a recommendation system, there is also a possibility that the user is not interested in a structure probably because the structure was historically not provided to the user by the recommendation system. Therefore, the structural preference is adjusted based on service demand, and is intervened and explored, thereby effectively discovering a new interest of the user, breaking the information cocoons, and further satisfying the user demand.

The technical solution of embodiments of the present disclosure determines a structural preference of a user to realize global-oriented structured representation and interest reasoning, and then determines a recommendation result based on the structural preference, such that there is a corresponding recommendation content in the recommendation result based on each different structure, thereby providing a recommendation content better satisfying the user preference, enhancing the matching degree between the content supply and the user preference, effectively contributing to immersive experience of the user using a recommendation system, and driving significant improvement of indexes, such as product duration and distribution.

Figure 2A:
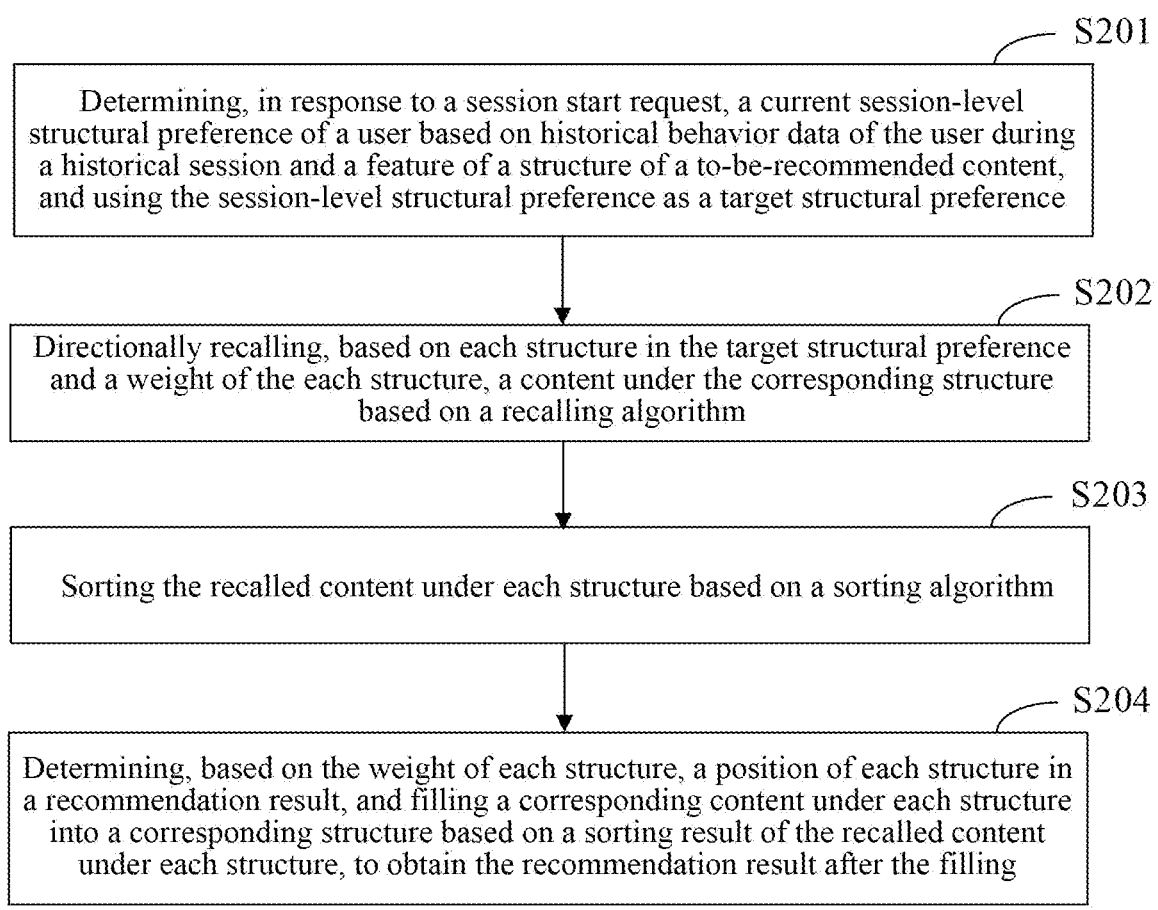
FIG. 2a is a schematic flowchart of the method for recommending a content according to an embodiment of the present disclosure.

FIG. 2a is a schematic flowchart of the method for recommending a content according to an embodiment of the present disclosure. The present embodiment provides further optimization based on the above embodiment. As shown in FIG. 2a, the method includes following steps.

S201: determining, in response to a session start request, a current session-level structural preference of a user based on historical behavior data of the user during a historical session and a feature of a structure of a to-be-recommended content, and using the session-level structural preference as a target structural preference.

When using a content recommendation product, the user may often go through a continuous browsing or consumption process from opening a page to start use to exiting the page to stop the use, and perform a series of operations and feedbacks during the period. This process is referred to as a session. The longer the session of the user is, the longer the immersion state of the user is in content recommendation, which indirectly indicates that the better the recommendation effect is, the higher the matching degree between the recommended content and a user preference is.

The user preference will not be kept consistently in each session. Therefore, an embodiment of the present disclosure determines, in response to the session start request, the current session-level structural preference of the user based on the historical behavior data of the user during the historical session and the feature of the structure of the to-be-recommended content, and uses the session-level structural preference as the target structural preference. That is, each time when a session is started, the session-level structural preference of the user in a current session may be predicted, thereby achieving better recommendation. The historical behavior data may be, e.g., data generated during the last session of the user, or data generated during a session that occurs in a set time period including at least the last data.

Specifically, the historical behavior data includes a historically selected structure content, a historically selected item content, a historically unselected structure content, and a historically unselected item content. The historically selected structure content refers to a structure selected (e.g., selected by clicking) by the user among structures involved in the recommended content, and the historically unselected structure content refers to an unselected structure. The historically selected item content refers to an item selected by the user among items in the recommended content, and the historically unselected item content refers to an unselected item. The historically selected structure content and the historically selected item content may reflect a content that the user is interested in. The historically unselected structure content and the historically unselected item content may reflect a content that the user is not interested in. These structure contents and item contents may all be displayed in a list form.

The feature of the structure is represented by a structure name and a structure attribute. Specifically, the structure name and the structure attribute may be combined to form the feature of the structure. The structure attribute represents historical click and display information of different structures, e.g., statistical values such as the number of clicks and the number of displays. The historical click and display information may reflect average advantage degrees of different structures as a whole, and provide information for individualized scoring to a certain extent.

In addition, not only the historical behavior data and the feature of the structure, but also a first scenario feature may be considered, to determine the current session-level structural preference of the user based on the historical behavior data, the first scenario feature, and the feature of the structure. That is, the current session-level structural preference of the user is determined based on the historical behavior data of the user during the historical session, the first scenario feature, and the feature of the structure of the to-be-recommended content. The first scenario feature represents a scenario of each session. The scenario may be pre-classified based on service demand. For example, the scenario may be classified based on time period into, e.g., morning peak, morning, noon, afternoon, or evening peak, or may be classified directly based on geographic location into, e.g., home, office, or park. Embodiments of the present disclosure do not impose any limitation on a specific scenario classifying approach. The session-level structural preference is determined based on a scenario feature of the user, such that a reasoning result of the structural preference is more accurate and more comprehensive.

In an implementation, the determining the current session-level structural preference of the user based on the historical behavior data of the user during the historical session and the feature of the structure of the to-be-recommended content includes: determining the current session-level structural preference of the user using a pretrained session-level structural preference model based on the historical behavior data of the user during the historical session and the feature of the structure of the to-be-recommended content; where a learning target of the session-level structural preference model includes a preference degree of the user for any structure within the session.

That is, the session-level structural preference is predicted using a pre-trained deep learning model in combination with a deep learning technology. The model may be updated daily, and may be used for predicting the session-level structural preference of the user in real time. Specifically, a training process of the session-level structural preference model includes: using a plurality of training samples as model inputs, where each training sample is the user behavior data generated during a session, each training sample includes N sub-samples, each sub-sample is the user behavior data of each structure displayed for the session, and N is a natural number; and using a percentage of a click rate of each structure involved in each pre-annotated training sample as a model output to train the session-level structural preference model.

Each training sample may include a plurality of structures. In order to avoid confusion, an embodiment of the present disclosure classifies the training sample into N sub-samples. Each sub-sample is the user behavior data of each structure displayed for the session. In addition, the model may be implemented by, e.g., a DNN (deep neural network), and model parameters may be learned in the training by gradient backpropagation. It should be noted that an embodiment of the present disclosure does not impose any limitation on a model algorithm or a training approach.

Figure 2B:
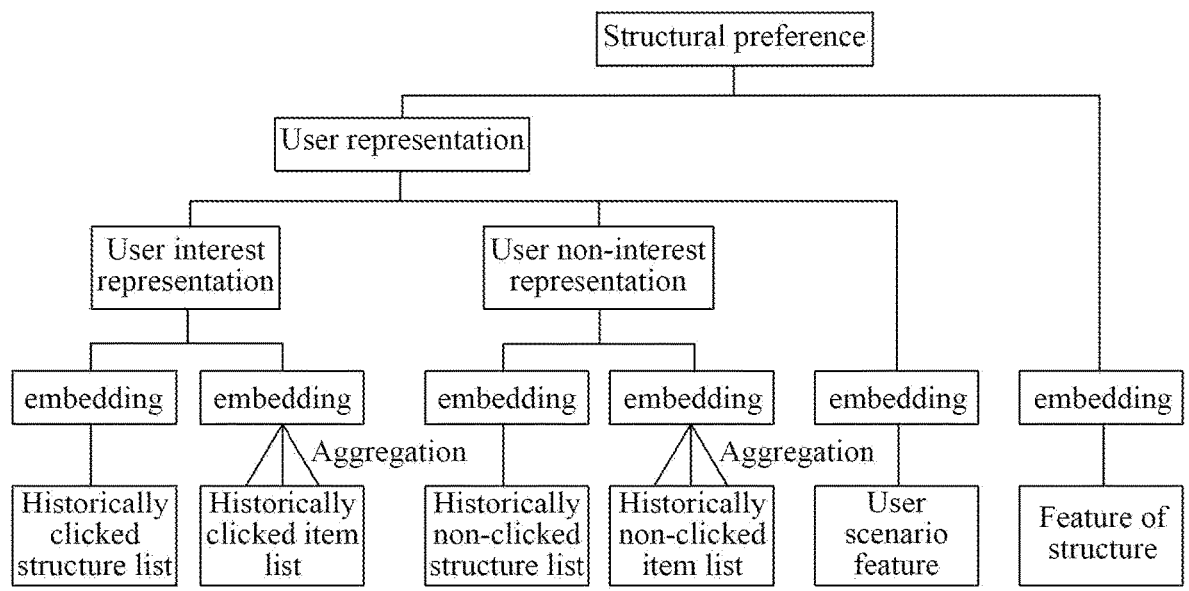
FIG. 2b is a network structural diagram of a session-level structural preference model according to an embodiment of the present disclosure.

FIG. 2b is a network structural diagram of a session-level structural preference model according to an embodiment of the present disclosure. As an example, as shown in the figure, the model extracts a user interest representation based on inputted embedding of a historically clicked structure list and embedding of an aggregated historically clicked item list, extracts a user non-interest representation based on embedding of a historically non-clicked structure list and embedding of an aggregated historically non-clicked item list, then obtains a user representation based on embedding of a user scenario feature, and finally predicts a structural preference of the user based on embedding of a feature of a structure.

S202: directionally recalling, based on each structure in the target structural preference and a weight of the each structure, a content under the corresponding structure based on a recalling algorithm.

In a method for recommending a content based on a layer-by-layer selection mechanism in an existing technology, a strategy of a recalling module is recalling by matching between user vectors and content vectors in a full resource database based on user behavior history and a deep learning model. In an embodiment of the present disclosure, the target structural preference of the user is pre-estimated and pre-computed before the recalling. Therefore, the recalling strategy may be upgraded to structured recalling, i.e., directionally recalling the content under the corresponding structure based on a target structural preference estimated by a system and a weight of the target structural preference. The target structural preference includes a weight representation of a user on a preference degree for each structure. Based on the weight representation and a preset threshold, a top preset number of structures may be selected as a target of the recalling, thereby focusing more computing power through structured recalling on a structure that the user is really interested in, providing enough more candidate contents for each structure in the target structural preference, and recalling a better resource content under a structure of the user preference. Here, it should be noted that an embodiment of the present disclosure does not impose any limitation on the recalling algorithm.

S203: sorting the recalled content under each structure based on a sorting algorithm.

That is, the recalled content under each structure in the target structural preference is sorted. An embodiment of the present disclosure does not impose any limitation on the sorting algorithm.

S204: determining, based on the weight of each structure, a position of each structure in a recommendation result, and filling a corresponding content under each structure into a corresponding structure based on a sorting result of the recalled content under each structure, to obtain the recommendation result after the filling.

Through the structured fusion implemented in S204, a content may be distributed to the user using a structure best satisfying the user preference, and a best resource to which each structure belongs may be displayed.

The technical solution of embodiments of the present disclosure determines a session-level structural preference of a user to realize global-oriented structured representation and interest reasoning, and determines a recommendation result based on the session-level structural preference each time when a session is started, such that there is a corresponding recommendation content in the recommendation result based on each different structure, thereby providing the recommendation content better satisfying the user preference, and enhancing the matching degree between the content supply and the user preference.

Figure 3A:
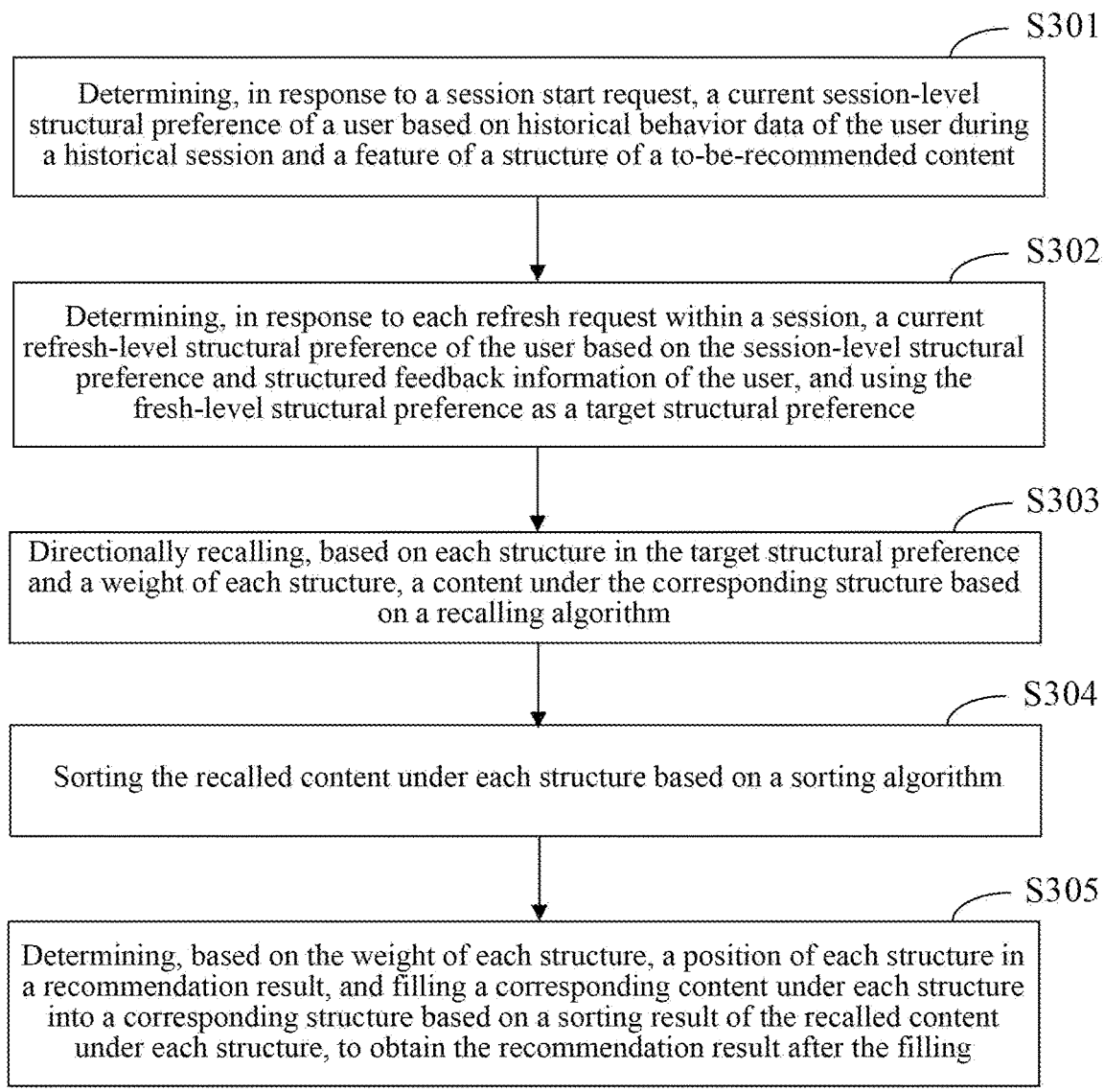
FIG. 3a is a schematic flowchart of the method for recommending a content according to an embodiment of the present disclosure.

FIG. 3a is a schematic flowchart of the method for recommending a content according to an embodiment of the present disclosure. The present embodiment provides further optimization based on the above embodiments. As shown in FIG. 3a, the method specifically includes following steps.

S301: determining, in response to a session start request, a current session-level structural preference of a user based on historical behavior data of the user during a historical session and a feature of a structure of a to-be-recommended content.

S302: determining, in response to each refresh request within a session, a current refresh-level structural preference of the user based on the session-level structural preference and structured feedback information of the user, and using the fresh-level structural preference as a target structural preference.

In a session, a server may often send a recommendation result to a client a plurality of times. User operations, such as sliding up and pulling down, on the client may trigger an interaction with the server, which is referred to as a refresh. Generally, a session consists of a plurality of consecutive refreshes, and a next refresh may be adjusted in real time based on the user's feedback on a last refresh. That is, based on the session-level structural preference predicted in this session, in combination with the session-level structural preference and the structured feedback information of the user, a refresh-level structural preference of each refresh is determined, to more fine-grainedly predict a structural preference of the user.

The structured feedback information represents statisticized feedback information of different structures based on user behavior data within a historically set time period including a last refreshing process. That is, based on behavior data in the last refreshing process and behavior data in other refreshing processes within the set time period (for example, one week), the feedback information of different structures is statisticized, e.g., statistical values such as the number of displays or a percentage of clicks of different structures.

In an embodiment, the refresh-level structural preference may be predicted by evolutionary learning. For example, the session-level structural preference is adjusted using an evolutionary learning model with the session-level structural preference and the structured feedback information as model inputs, to output the refresh-level structural preference. An embodiment of the present disclosure does not impose any limitation on the model structure and algorithm.

In addition, a second scenario feature may also be considered, i.e., determining the current refresh-level structural preference of the user based on the session-level structural preference, the second scenario feature, and the structured feedback information of the user, where the second scenario feature represents a scenario of each fresh. Based on the scenario feature, a more accurate and comprehensive structural preference may be predicted. An embodiment of the present disclosure does not impose any limitation on a scenario classifying approach.

Figure 3B:
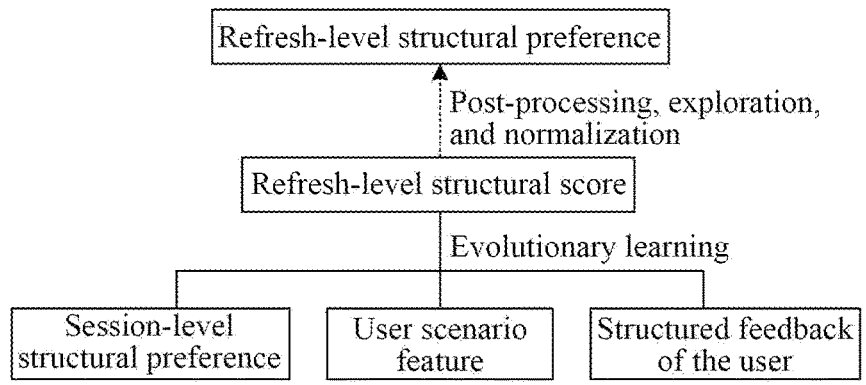
FIG. 3b is a schematic diagram of a fresh-level structural preference model according to an embodiment of the present disclosure.

FIG. 3b is a schematic diagram of a fresh-level structural preference model according to an embodiment of the present disclosure. After obtaining the refresh-level structural score, post-processing, exploration, and normalization in a structural dimension may also be performed based on service demand, to obtain a final refresh-level structural preference.

S303: directionally recalling, based on each structure in the target structural preference and a weight of each structure, a content under the corresponding structure based on a recalling algorithm.

S304: sorting the recalled content under each structure based on a sorting algorithm.

S305: determining, based on the weight of each structure, a position of each structure in a recommendation result, and filling a corresponding content under each structure into a corresponding structure based on a sorting result of the recalled content under each structure, to obtain the recommendation result after the filling.

The technical solution of an embodiment of the present disclosure sets two levels of structured representations, and after a session-level structural preference is determined, further determines, based on the session-level structure preference, a refresh-level structural preference during each refresh in a session, and reasons a user preference from a more fine-grained perspective, thereby obtaining a recommendation content better satisfying a current structural preference of the user during each refresh, and further enhancing the matching degree between the content supply and the user preference.

Figure 4:
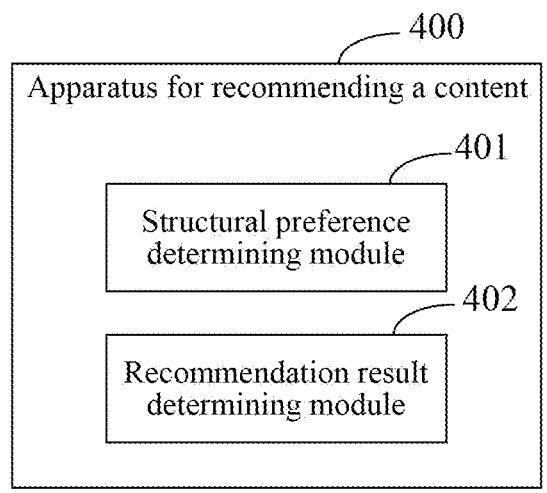
FIG. 4 is a schematic structural diagram of an apparatus for recommending a content according to an embodiment of the present disclosure.

FIG. 4 is a schematic structural diagram of an apparatus for recommending a content according to an embodiment of the present disclosure. The present embodiment is applicable to a case of recommending a content fora user, e.g., recommending a content for the user through a feed system, and relates to intelligent recommendation, deep learning, and big data technologies. The apparatus may implement the method for recommending a content according to any embodiment of the present disclosure. As shown in FIG. 4, the apparatus 400 specifically includes following modules.

A structural preference determining module 401 is configured to determine, based on historical behavior data of a user using a product and a feature of a structure of a to-be-recommended content, a target structural preference of the user, the structure being determined by classifying the to-be-recommended content based on any classifying method of a content tag system.

A recommendation result determining module 402 is configured to determine each recommendation result of the user based on the target structural preference, the recommendation result including at least two structures and a recommendation content corresponding to each structure.

Alternatively, the structural preference determining module includes: a session-level structural preference determining unit configured to determine, in response to a session start request, a current session-level structural preference of the user based on the historical behavior data of the user during a historical session and the feature of the structure of the to-be-recommended content, and use the session-level structural preference as the target structural preference.

Alternatively, the historical behavior data includes a historically selected structure content, a historically selected item content, a historically unselected structure content, and a historically unselected item content.

Alternatively, the feature of the structure is represented by a structure name and a structure attribute, where the structure attribute represents historical click and display information of different structures.

Alternatively, the session-level structural preference determining unit is configured to: determine the current session-level structural preference of the user based on the historical behavior data of the user during the historical session, a first scenario feature, and the feature of the structure of the to-be-recommended content, where the first scenario feature represents a scenario of each session.

Alternatively, the session-level structural preference determining unit is further configured to: determine the current session-level structural preference of the user using a pretrained session-level structural preference model based on the historical behavior data of the user during the historical session and the feature of the structure of the to-be-recommended content.

A learning target of the session-level structural preference model includes a preference degree of the user for any structure within the session.

Alternatively, a training process of the session-level structural preference model includes: using a plurality of training samples as model inputs, where each training sample is user behavior data generated during a session, each training sample includes N sub-samples, each sub-sample is the user behavior data of each structure displayed for the session, and N is a natural number; and using a percentage of a click rate of each structure involved in each pre-annotated training sample as a model output to train the session-level structural preference model.

Alternatively, the structural preference determining module further includes: a fresh-level structural preference determining unit configured to determine, in response to each refresh request within the session, a current refresh-level structural preference of the user based on the session-level structural preference and structured feedback information of the user, and use the fresh-level structural preference as the target structural preference.

The structured feedback information represents statisticized feedback information of different structures based on user behavior data within a historically set time period including a last refreshing process.

Alternatively, the fresh-level structural preference determining unit is configured to: adjust the session-level structural preference using an evolutionary learning model with the session-level structural preference and the structured feedback information as model inputs, to output the refresh-level structural preference.

Alternatively, the fresh-level structural preference determining unit is specifically further configured to: determine the current refresh-level structural preference of the user based on the session-level structural preference, a second scenario feature, and the structured feedback information of the user, where the second scenario feature represents a scenario of each fresh.

Alternatively, the apparatus further includes: an exploring module configured to explore in a structural dimension based on the target structural preference before the recommendation result determining module determines each recommendation result of the user based on the target structural preference.

Alternatively, the recommendation result determining module is configured to: determine each recommendation result of the user through recalling, sorting, and fusion based on the target structural preference.

Alternatively, the target structural preference includes a weight representation of the user for each structural preference degree.

Accordingly, the recommendation result determining module includes: a recalling unit configured to directionally recall, based on each structure in the target structural preference and a weight of the each structure, a content under the corresponding structure based on a recalling algorithm; a sorting unit configured to sort the recalled content under each structure based on a sorting algorithm; and a fusing unit configured to determine, based on the weight of each structure, a position of each structure in the recommendation result, and fill a corresponding content under each structure into a corresponding structure based on a sorting result of the recalled content under each structure, to obtain the recommendation result after the filling.

The apparatus 400 for recommending a content provided in embodiments of the present disclosure may execute the method for recommending a content provided in any embodiment of the present disclosure, and has corresponding function modules for executing the method and beneficial effects. Description in any embodiment of the method of the present disclosure may be referred to for contents that are not described in detail in the present embodiment.

According to an embodiment of the present disclosure, the present disclosure further provides an electronic device and a readable storage medium.

Figure 5:
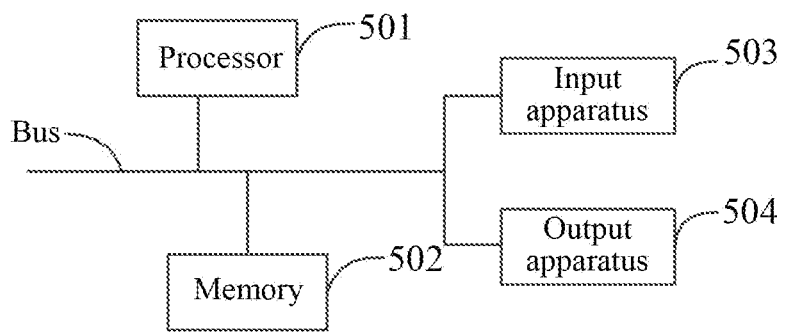
FIG. 5 is a block diagram of an electronic device for implementing the method for recommending a content of embodiments of the present disclosure.

As shown in FIG. 5, a block diagram of an electronic device of the method for recommending a content according to embodiments of the present disclosure is shown. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 5, the electronic device includes: one or more processors 501, a memory 502, and interfaces for connecting various components, including a high-speed interface and a low-speed interface. The various components are interconnected using different buses, and may be mounted on a common motherboard or in other manners as required. The processor may process instructions for execution within the electronic device, including instructions stored in the memory or on the memory to display graphical information for a GUI on an external input/output apparatus (e.g., a display device coupled to an interface). In other implementations, a plurality of processors and/or a plurality of buses may be used, as appropriate, along with a plurality of memories. Similarly, a plurality of electronic devices may be connected, with each device providing portions of necessary operations (e.g., as a server array, a group of blade servers, or a multi-processor system). In FIG. 5, a processor 501 is taken as an example.

The memory 502 is a non-transitory computer readable storage medium provided in embodiments of the present disclosure. The memory stores instructions executable by at least one processor, such that the at least one processor executes the method for recommending a content provided in embodiments of the present disclosure. The non-transitory computer readable storage medium of embodiments of the present disclosure stores computer instructions. The computer instructions are used for causing a computer to execute the method for recommending a content provided in embodiments of the present disclosure.

As a non-transitory computer readable storage medium, the memory 502 may be configured to store non-transitory software programs, non-transitory computer executable programs, and modules, e.g., the program instructions/modules (e.g., the structural preference determining module 401 and the recommendation result determining module 402 shown in FIG. 4) corresponding to the method for recommending a content in embodiments of the present disclosure. The processor 501 runs non-transitory software programs, instructions, and modules stored in the memory 502, to execute various function applications and data processing of a server, i.e., implementing the method for recommending a content in embodiments of the method.

The memory 502 may include a program storage area and a data storage area, where the program storage area may store an operating system and application programs required by at least one function; and the data storage area may store, e.g., data created based on use of the electronic device of the method for recommending a content in embodiments of the present disclosure. In addition, the memory 502 may include a high-speed random-access memory, and may further include a non-transitory memory, such as at least one disk storage component, a flash memory component, or other non-transitory solid state storage components. In some embodiments, the memory 502 alternatively includes memories disposed remotely relative to the processor 501, and these remote memories may be connected to the electronic device implementing the method for recommending a content of embodiments of the present disclosure via a network. Examples of the above network include, but are not limited to, the Internet, an intranet, a local area network, a mobile communication network, and a combination thereof.

The electronic device implementing the method for recommending a content of embodiments of the present disclosure may further include: an input apparatus 503 and an output apparatus 504. The processor 501, the memory 502, the input apparatus 503, and the output apparatus 504 may be connected through a bus or in other manners. Bus connection is taken as an example in FIG. 5.

The input apparatus 503 may receive input digital or character information, and generate key signal inputs related to user settings and function control of the electronic device for performing the method for recommending a content, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and a block chain network.

The computer system may include a client and a server. The client and the server are generally remote from each other and typically interact through the communication network. The relationship between the client and the server is generated through computer programs running on the respective computers and having a client-server relationship to each other. The server may be a cloud server, also known as a cloud computing server or a cloud host, and is a host product in a cloud computing service system, so as to solve the defects of difficult management and weak service extendibility existing in conventional physical hosts and VPS services.

The technical solutions according to embodiments of the present disclosure determine a structural preference of a user to realize global-oriented structured representation and interest reasoning, and then determine a recommendation result based on a structural preference, such that there is a corresponding recommendation content in the recommendation result based on each different structure, thereby providing the recommendation content better satisfying the user preference, and enhancing the matching degree between the content supply and the user preference.

It should be understood that the various forms of processes shown above can be used to reorder, add, or delete steps. For example, the steps disclosed in embodiments of the present disclosure can be executed in parallel, sequentially, or in different orders, as long as the desired results of the technical solutions disclosed in embodiments of the present disclosure can be achieved. This is not limited herein.

The above specific implementations do not constitute a limitation to the protection scope of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be included within the protection scope of the present disclosure.

What is claimed is:

1. A method for recommending a content, comprising:
   determining, in response to a session start request, a current session-level structural preference of a user using a pretrained session-level structural preference model based on historical behavior data of the user during a historical session and a feature of a structure of a to-be-recommended content, the structure being determined by classifying the to-be-recommended content based on any classifying method of a content tag system, a learning target of the session-level structural preference model comprising a preference degree of the user for any structure within a session, and the current session-level structural preference being used as a target structural preference of the user; and determining each recommendation result of the user based on the target structural preference, the recommendation result comprising at least two structures and a recommendation content corresponding to each structure,
  wherein a training process of the session-level structural preference model comprises:
    using a plurality of training samples as model inputs, wherein each training sample is user behavior data generated during a session, each training sample comprises N sub-samples, each sub-sample is the user behavior data of each structure displayed for the session, and N is a natural number; and
    using a percentage of a click rate of each structure involved in each pre-annotated training sample as a model output to train the session-level structural preference model.

2. The method according to claim 1, wherein the historical behavior data comprises a historically selected structure content, a historically selected item content, a historically unselected structure content, and a historically unselected item content.

3. The method according to claim 1, wherein the feature of the structure is represented by a structure name and a structure attribute, wherein the structure attribute represents historical click and display information of different structures.

4. The method according to claim 1, wherein the determining the current session-level structural preference of the user based on the historical behavior data of the user during the historical session and the feature of the structure of the to-be-recommended content comprises:
  determining the current session-level structural preference of the user based on the historical behavior data of the user during the historical session, a first scenario feature, and the feature of the structure of the to-be-recommended content, wherein the first scenario feature represents a scenario of each session.

5. The method according to claim 1, further comprising:
  determining, in response to each refresh request within the session, a current refresh-level structural preference of the user based on the current session-level structural preference and structured feedback information of the user, and using the current refresh-level structural preference as the target structural preference,
  wherein the structured feedback information represents statisticized feedback information of different structures based on user behavior data within a historically set time period including a last refreshing process.

6. The method according to claim 4, wherein the determining the current refresh-level structural preference of the user based on the current session-level structural preference and the structured feedback information of the user comprises:
  adjusting the current session-level structural preference using an evolutionary learning model with the current session-level structural preference and the structured feedback information as model inputs, to output the current refresh-level structural preference.

7. The method according to claim 4, wherein the determining the current refresh-level structural preference of the user based on the current session-level structural preference and the structured feedback information of the user comprises:
  determining the current refresh-level structural preference of the user based on the current session-level structural preference, a second scenario feature, and the structured feedback information of the user, wherein the second scenario feature represents a scenario of each refresh.

8. The method according to claim 1, further comprising, before the determining the each recommendation result of the user based on the target structural preference:
  exploring in a structural dimension based on the target structural preference.

9. The method according to claim 1, wherein the determining the each recommendation result of the user based on the target structural preference comprises:
  determining the each recommendation result of the user through recalling, sorting, and fusion based on the target structural preference.

10. The method according to claim 9, wherein the target structural preference comprises a weight representation of the user for each structural preference degree; and
  accordingly, the determining the each recommendation result of the user through recalling, sorting, and fusion based on the target structural preference comprises:
    directionally recalling, based on each structure in the target structural preference and a weight of the each structure, a content under the corresponding structure based on a recalling algorithm;
    sorting the recalled content under the each structure based on a sorting algorithm; and
    determining, based on the weight of the each structure, a position of the each structure in the recommendation result, and filling a corresponding content under the each structure into a corresponding structure based on a sorting result of the recalled content under the each structure, to obtain the recommendation result after the filling.

11. An electronic device, comprising:
  at least one processor; and
  a memory communicatively connected with the at least one processor;
  the memory storing instructions executable by the at least one processor, and the instructions, when executed by the at least one processor, causing the at least one processor to perform operations, the operations comprising:
  determining, in response to a session start request, a current session-level structural preference of a user using a pretrained session-level structural preference model based on historical behavior data of the user during a historical session and a feature of a structure of a to-be-recommended content, the structure being determined by classifying the to-be-recommended content based on any classifying method of a content tag system, a learning target of the session-level structural preference model comprising a preference degree of the user for any structure within a session, and the current session-level structural preference being used as a target structural preference of the user; and
  determining each recommendation result of the user based on the target structural preference, the recommendation result comprising at least two structures and a recommendation content corresponding to each structure,
    wherein a training process of the session-level structural preference model comprises:
      using a plurality of training samples as model inputs, wherein each training sample is user behavior data generated during a session, each training sample comprises N sub-samples, each sub-sample is the user behavior data of each structure displayed for the session, and N is a natural number; and using a percentage of a click rate of each structure involved in each pre-annotated training sample as a model output to train the session-level structural preference model.

12. A non-transitory computer readable storage medium storing computer instructions, the computer instructions, when executed by a computer, causing the computer to perform operations, the operations comprising:

determining, in response to a session start request, a current session-level structural preference of a user using a pretrained session-level structural preference model based on historical behavior data of the user during a historical session and a feature of a structure of a to-be-recommended content, the structure being determined by classifying the to-be-recommended content based on any classifying method of a content tag system, a learning target of the session-level structural preference model comprising a preference degree of the user for any structure within a session, and the current session-level structural preference being used as a target structural preference of the user; and determining each recommendation result of the user based on the target structural preference, the recommendation result comprising at least two structures and a recommendation content corresponding to each structure, wherein a training process of the session-level structural preference model comprises:

using a plurality of training samples as model inputs, wherein each training sample is user behavior data generated during a session, each training sample comprises N sub-samples, each sub-sample is the user behavior data of each structure displayed for the session, and N is a natural number; and using a percentage of a click rate of each structure involved in each pre-annotated training sample as a model output to train the session-level structural preference model.

* * * * *